W. H. Seymour.
Harvester Rake.
No. 111,483.    Patented Jan. 31, 1871.
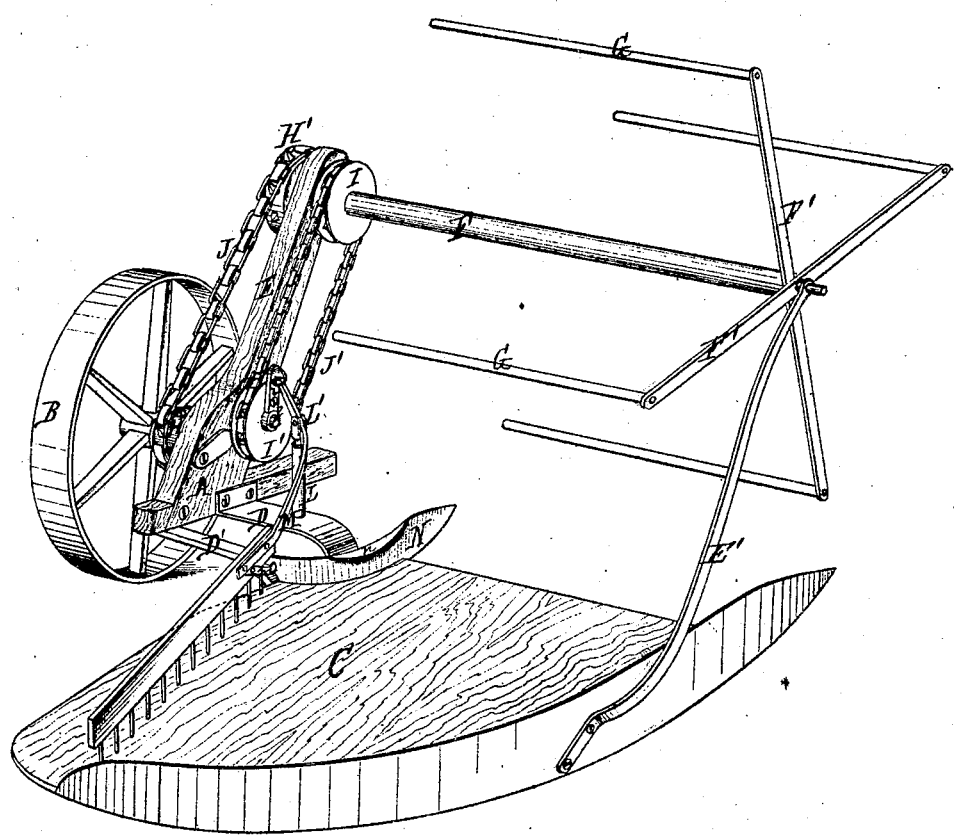
Witnesses.
Aleys McMahon
H. H. Doubleday
William H. Seymour
by his Attorney
A. M. Smith

UNITED STATES PATENT OFFICE.

WILLIAM H. SEYMOUR, OF BROCKPORT, NEW YORK.

IMPROVEMENT IN HARVESTER REELS AND RAKES.

Specification forming part of Letters Patent No. 111,483, dated January 31, 1871.

*To all whom it may concern:*

Be it known that I, WILLIAM H. SEYMOUR, of Brockport, in the county of Monroe, State of New York, have invented certain new and useful Improvements in Harvester-Rakes, of which the following is a full, clear, and exact description, reference being had to the accompanying drawing, making a part of this specification, which is a perspective view of so much of a harvesting-machine as is necessary to show my invention.

In harvesting-machines employing a vibrating or sweep rake for discharging the grain from the platform, in connection with the ordinary reel for gathering the grain into the cutters and depositing it upon the platform, such machines, as heretofore constructed, are well adapted to the work for which they are intended where the grain is in good condition and of an average height; but in cutting short grain, barley, or clover for seed it has been found impracticable to make the rake reach forward underneath the reel sufficiently far to enable it to fully grasp the grain where it was deposited by the latter, and consequently the grain was allowed to accumulate on the forward edge of the platform and over the rear edge of the cutters, thereby frequently obstructing to some extent the action of the latter, and causing considerable waste of grain.

The object of the present improvement is to overcome these difficulties, and to adapt the machine to short or fallen grain, barley, and clover for seed without in any way impairing its efficiency in its use in ordinary grain; and to this end the invention consists in a novel construction and arrangement of the reel and rake, whereby the latter is adapted to reach forward through the path or circle traversed by the reel-beaters, and to strike into the grain in advance of the cutters, in such manner as to assist the beaters in picking up the grain and presenting the same to the cutters, and at the same time to effect a more perfect discharge of the grain by carrying with it, in its delivery stroke, the short stalks and heads, which would otherwise lodge upon and tend to clog the cutting apparatus.

To enable others to more fully understand the invention, I will describe the same with reference to the drawing, in which—

A represents the main or tongue frame; B, the main drive-wheel, mounted on a short stationary axle; and C, the circular or quadrant platform, connected with the frame A through the medium of the platform-bars D D', the former of which, D, may, if desired, form an extension of the finger-bar, to which the platform may be connected in any usual manner.

E is the reel-post; F, the reel-shaft, mounted in a suitable box or bearings in the upper end of said post; and G, the reel-beaters, connected with shaft F by arms F', at their outer ends only, as represented in the drawing, in such manner as to leave the inner ends open for the passage of the rake between the shaft and beaters, as hereinafter described.

The reel-shaft may be supported at its inner or main frame end only, in any manner usual with "overhung" reels; or, if preferred, it may be provided with an additional support, E', at its outer end, to prevent any tendency to sag at such end, consequent upon the manner of supporting the beaters.

H' and I are two sprocket wheels or pulleys, mounted upon the reel-shaft on opposite sides of the post E, the former of which, H', drives the reel-shaft, receiving its motion through a chain, J, from a corresponding sprocket-wheel, H, mounted on the main axle or hub of the driving-wheel B.

At or near the foot of the reel-post is a short stationary shaft, $k$, on which is mounted a sprocket-wheel, I', which receives motion from the sprocket-wheel I on the reel-shaft through the chain J', and from which motion is imparted to the rake, as will be explained.

L is an upright tubular standard or socket, attached to the bar D, or to the main-frame finger-bar or shoe, as may be preferred, and L' is the vertical rake-pivot, mounted in the socket or standard L. M is an angular or bent rake-arm, pivoted horizontally in a fork in the upper end of the rake-pivot L', to the outer end of which the rake-head is connected, as represented in the drawing.

The heel end of rake-arm M is connected eccentrically, by a ball-and-socket or universal joint, with the face of sprocket-wheel I, or with a crank-arm, $i$, connected to said wheel.

The inner grain-guard, N, of the platform is curved in the arc of a circle, of which the rake-standard L is the center, and is provided at its upper edge with a horizontal lip or flange, $u$, underneath which a hook or lip, $m$, attached to the rake head or arm, passes, for holding the rake down upon the platform while operating to discharge the grain.

The operation of the rake is as follows: Supposing the parts to be in position shown in the drawing, with the rake at or near the completion of its discharging stroke, and with the crank-arm moving forward and downward, as the crank-arm descends it carries with it the heel-extension of the rake-arm, and said arm, vibrating on its horizontal pivot, raises the rake-head in the path of a vertical or nearly vertical circle in a plane inside the inner open ends of the reel-beaters until the rake-arm, swinging on its vertical pivot L', has carried the rake-head within the path or circle described by the reel-beaters, when, by the rising of the crank-arm and heel-extension of the rake-arm, the rake-head is caused to move in between the reel-beaters and reel-shaft, over the former, and underneath the shaft, and, passing through the path of the beaters, strikes into the grain in front of the cutters, after which, by the forward movement of the crank-arm, the rake, sweeping backward, carries the grain with it to the cutters, and thence over the platform, discharging it upon the ground.

Other devices may be used for operating the rake; but those described are found to be simple and efficient in practice.

The rake-arm M is slotted at the point of its horizontal pivot to allow slight end-play, and the vertical pivot L' is adapted to rise and fall in its tubular standard or socket for the purpose of preventing any cramping of the parts.

The connection of the rake-driving mechanism with the reel-shaft and the mechanism for driving the same causes the rake to act in uniform relation to the reel-beaters, and prevents it from becoming caught by and entangled with said beaters in passing through the path described by them.

The relative size of the sprocket or gear wheels I I' may be varied, so as to cause the reel to make one, one and a quarter, or one and a half (more or less) revolutions to one vibration of the rake, care being taken in sizing the gears to cause the rake to always pass in the same relation to the beaters.

The sprocket-wheel H or H' may be connected with its shaft by a backing-ratchet, so that the reel and rake will remain stationary when the machine is backed; or a clutching device may be used on the reel or crank shaft, by which the rake only will be thrown out of action when the machine is backed, or which may be actuated by the attendant for throwing the rake out of gear for increasing the size of the gavel, the arrangement of said clutching device being such that when again thrown into gear the rake will resume its proper working relation to the reel-beaters.

Having now described my invention, what I claim as new, and desire to secure by Letters Patent, is—

1. The reel constructed substantially as described—that is to say, with its beaters supported at their outer ends, and left open or disconnected from the shaft at their inner ends, to permit the passage of the rake through the path of the beaters.

2. The combination, with the reel, constructed substantially as described, of a vibrating or sweep rake, adapted to pass through the path of the reel-beaters and between said beaters and the reel-shaft, substantially as set forth.

3. The rake operating, relatively to the reel, as described, in combination with mechanism operated from the reel-shaft for driving said rake and timing its movements to those of the reel.

WILLIAM H. SEYMOUR.

Witnesses:
  DANIEL HOLMES,
  CHAS. F. MULLER.